US012004689B2

(12) United States Patent
Lyons et al.

(10) Patent No.: US 12,004,689 B2
(45) Date of Patent: Jun. 11, 2024

(54) TOASTER WITH INPUT CONTROL

(71) Applicant: Marmon Foodservice Technologies, Inc., Osseo, MN (US)

(72) Inventors: Christopher Lyons, Western Springs, IL (US); Kyle Kestner, Schaumburg, IL (US); Greg Klostermann, Arlington Heights, IL (US); Elizabeth Bertness, Batavia, IL (US); Michael Rainone, Palestine, TX (US); Caleb Nehls, Tyler, TX (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 357 days.

(21) Appl. No.: 17/217,396

(22) Filed: Mar. 30, 2021

(65) Prior Publication Data
US 2021/0298526 A1     Sep. 30, 2021

Related U.S. Application Data

(60) Provisional application No. 63/002,603, filed on Mar. 31, 2020.

(51) Int. Cl.
*A47J 37/08*     (2006.01)
*A47J 36/32*     (2006.01)
*B65G 43/08*     (2006.01)

(52) U.S. Cl.
CPC .......... *A47J 37/0857* (2013.01); *A47J 36/32* (2013.01); *B65G 43/08* (2013.01);
(Continued)

(58) Field of Classification Search
CPC ............ B65G 43/08; B65G 2203/0233; B65G 2203/0291; B65G 2203/044; A47J 37/044;
(Continued)

(56) References Cited

U.S. PATENT DOCUMENTS

| 4,151,791 A | 5/1979 | Baker |
| 4,254,697 A | 3/1981 | Lang-Ree et al. |

(Continued)

FOREIGN PATENT DOCUMENTS

| EP | 2384135 | 8/2013 |
| WO | 2020091840 | 5/2020 |

OTHER PUBLICATIONS

"Nieco Model FH94 Gas Owner's Manual", Nieco, retrieved from https://nieco.com/wp-content/uploads/2020/04/FH94G-Manual-2020.pdf on Oct. 28, 2020.
(Continued)

*Primary Examiner* — Hung D Nguyen
(74) *Attorney, Agent, or Firm* — Andrus Intellectual Property Law, LLP

(57) ABSTRACT

A conveyor toaster includes a toaster cabinet, an opening extending through the toaster cabinet and configured to receive a food product, and a conveyor assembly positioned in the toaster housing and associated with the feed opening. The conveyor assembly includes a conveyor belt configured to be operated by a drive motor to transport the food product past a heating element. The conveyor toaster further includes a an input sensor arranged proximate the opening and configured to detect the food product and a processor operably coupled to the input sensor and the conveyor assembly. The processor is configured to change between an operating condition with a first belt speed and an idle condition with a second belt speed based upon a signal from the input sensor.

17 Claims, 10 Drawing Sheets

(52) U.S. Cl.
CPC .............. *B65G 2203/0233* (2013.01); *B65G 2203/0291* (2013.01); *B65G 2203/044* (2013.01)

(58) Field of Classification Search
CPC ...... A47J 37/045; A47J 37/0623; A47J 37/08; A47J 37/0821; A47J 37/0835; A47J 37/0857; A47J 37/0871; A47J 36/32; A47J 36/321
See application file for complete search history.

(56) References Cited

U.S. PATENT DOCUMENTS

| | | | |
|---|---|---|---|
| 4,286,509 A | 9/1981 | Miller et al. | |
| 4,389,562 A | 6/1983 | Chaudoir | |
| 4,881,519 A | 11/1989 | Henke | |
| 4,951,648 A | 8/1990 | Shukla et al. | |
| 5,179,265 A | 1/1993 | Sheridan et al. | |
| 5,253,564 A | 10/1993 | Rosenbrock et al. | |
| 5,588,354 A | 12/1996 | Stuck et al. | |
| 5,724,886 A | 3/1998 | Ewald et al. | |
| 5,821,503 A | 10/1998 | Witt | |
| 5,947,012 A | 9/1999 | Ewald et al. | |
| 6,006,656 A | 12/1999 | Lulofs et al. | |
| 6,035,765 A | 3/2000 | Finck | |
| 6,119,587 A | 9/2000 | Ewald et al. | |
| 6,209,447 B1 | 4/2001 | Ewald et al. | |
| 6,358,548 B1 | 3/2002 | Ewald et al. | |
| 6,595,117 B1 | 7/2003 | Jones et al. | |
| 6,607,766 B2 | 8/2003 | Ewald et al. | |
| 6,624,396 B2 | 9/2003 | Witt et al. | |
| 6,786,422 B1 | 9/2004 | Wortman et al. | |
| 6,817,283 B2 | 11/2004 | Jones et al. | |
| 7,038,172 B1 | 5/2006 | Stuck | |
| 7,091,452 B2 | 8/2006 | Kingdon et al. | |
| 7,105,779 B2 | 9/2006 | Shei | |
| 7,227,102 B2 | 6/2007 | Shei | |
| 7,297,903 B1 | 11/2007 | March et al. | |
| 7,303,776 B2 | 12/2007 | Sus et al. | |
| 7,340,992 B1 | 3/2008 | Wolfe et al. | |
| 7,541,559 B2 | 6/2009 | Milz | |
| 7,592,570 B2 | 9/2009 | Yoder et al. | |
| 7,726,967 B2 | 6/2010 | Best | |
| 7,765,918 B2 | 8/2010 | Garniss et al. | |
| 7,800,023 B2 | 9/2010 | Burtea et al. | |
| 7,851,727 B2 | 12/2010 | Burtea et al. | |
| 7,853,129 B2 | 12/2010 | Best | |
| 7,905,173 B2 | 3/2011 | Sus et al. | |
| 7,921,767 B2 | 4/2011 | Cook et al. | |
| 8,033,213 B2 | 10/2011 | Cook et al. | |
| 8,087,407 B2 | 1/2012 | Wiker et al. | |
| 8,272,320 B2 | 9/2012 | Baker et al. | |
| 8,281,779 B2 | 10/2012 | Wiker et al. | |
| 8,371,285 B2 | 2/2013 | Wiker et al. | |
| 8,522,675 B2 | 9/2013 | Veltrop | |
| 8,656,904 B2 | 2/2014 | Wortman et al. | |
| 8,695,489 B2 | 4/2014 | Ewald et al. | |
| 8,839,714 B2 | 9/2014 | Schjerven, Sr. et al. | |
| 8,839,779 B2 | 9/2014 | Wiker et al. | |
| 8,997,636 B2 | 4/2015 | Kirby et al. | |
| 9,049,875 B2 | 6/2015 | Ewald et al. | |
| 9,433,321 B2 | 9/2016 | Piazzi | |
| 9,585,400 B2 | 3/2017 | Wiker et al. | |
| 9,585,401 B2 | 3/2017 | Wiker et al. | |
| 9,609,981 B2 | 4/2017 | Schjerven, Sr. et al. | |
| 9,693,655 B2 | 7/2017 | Shei et al. | |
| 9,980,322 B1 | 5/2018 | Kestner et al. | |
| 10,004,358 B2 | 6/2018 | Wildebush | |
| 10,039,289 B2 | 8/2018 | Wiker et al. | |
| 10,244,894 B2 | 4/2019 | Boltz et al. | |
| 10,258,194 B2 | 4/2019 | Patel et al. | |
| 10,362,898 B2 | 7/2019 | Schjerven, Sr. et al. | |
| 10,660,466 B2 | 5/2020 | Yazvin et al. | |
| 2003/0042248 A1 | 3/2003 | Witt et al. | |
| 2003/0056658 A1 | 3/2003 | Jones et al. | |
| 2005/0205547 A1 | 9/2005 | Wenzel | |
| 2008/0289619 A1 | 11/2008 | Schjerven, Sr. et al. | |
| 2010/0058936 A1 | 3/2010 | Schjerven, Sr. et al. | |
| 2011/0114634 A1* | 5/2011 | Nevarez | A47J 37/045 392/416 |
| 2011/0226230 A1 | 9/2011 | Reese et al. | |
| 2011/0277643 A1 | 11/2011 | Schwierking et al. | |
| 2014/0199446 A1 | 7/2014 | Huegerich | |
| 2016/0296068 A1 | 10/2016 | Schjerven, Sr. et al. | |
| 2016/0327279 A1 | 11/2016 | Bhogal et al. | |
| 2017/0035234 A1 | 2/2017 | Schjerven, Sr. et al. | |
| 2017/0148376 A1* | 5/2017 | Yoo | G09G 3/20 |
| 2017/0328598 A9 | 11/2017 | Wortman et al. | |
| 2018/0289209 A1 | 10/2018 | Yazvin et al. | |
| 2018/0296035 A1 | 10/2018 | Wildebush | |
| 2018/0317709 A1 | 11/2018 | Leach | |
| 2018/0338354 A1 | 11/2018 | Bassill et al. | |
| 2018/0338503 A1 | 11/2018 | Wiker et al. | |
| 2019/0290063 A1 | 9/2019 | Shei | |

OTHER PUBLICATIONS

"Nieco FH94 Back of House: The Broiler Built by Combining 45 years of BK Experience & Innovation", Nieco, published Oct. 2019, retrieved from https://nieco.com/wp-content/uploads/2019/10/Nieco-FH94-Sales-Sheet.pdf on Oct. 28, 2020.
Extended European Search Report for European Patent Application No. 20205055.5, dated Mar. 15, 2021.

* cited by examiner

TOASTER WITH INPUT CONTROL

CROSS-REFERENCE TO RELATED APPLICATIONS

The present application claims priority to U.S. Provisional Patent Application No. 63/002,603, filed on Mar. 31, 2020, and which is incorporated by reference herein in its entirety.

BACKGROUND

The present disclosure is related to the field of toasters. More specifically, the present disclosure is related to toasters with adjustable conveyors that automatically increase in speed during periods of high toaster utilization and decrease in speed during periods of low toaster utilization.

A conveyor toaster is a well-known cooking device that uses a vertical or near-vertical heating platen and a rotating conveyor, which urges a food product against the platen while it simultaneously drags a food product downwardly and across the platen's hot surface. By virtue of its design, a conveyor toaster can process food products continuously as opposed to the toasters commonly used by consumers, which process food products in a batch mode.

Conveyor toasters are ill-suited for consumer use because of their size, manufacturing cost, power requirements, and the time required to pre-heat the platen to operating temperature. Conveyor toasters are preferred by restaurants and food preparation services however that require high-volume through-put and consistent heating/toasting of the food products.

Prior art conveyor toasters are known to operate at a consistent temperature and conveyor speed, calibrated to provide properly toasted food products, even during periods where the conveyor toaster is not actively toasting a food product and is merely awaiting the deposit of a food product. A conveyor toaster that automatically adjusts the conveyor belt speed for the purpose of decreasing wear on the conveyor belt assemblies would therefore be useful with the effect of reduced maintenance and replacement.

BRIEF DISCLOSURE

A conveyor toaster includes a toaster cabinet, an opening extending through the toaster cabinet and configured to receive a food product, and a conveyor assembly positioned in the toaster housing and associated with the feed opening. The conveyor assembly includes a conveyor belt configured to be operated by a drive motor to transport the food product past a heating element. The conveyor toaster further includes an input sensor arranged proximate the opening and configured to detect the food product and a processor operably coupled to the input sensor and the conveyor assembly. The processor is configured to change between an operating condition with a first belt speed and an idle condition with a second belt speed based upon a signal from the input sensor. The first belt speed is greater than the second belt speed.

In an example, the input sensor includes a photoemitter and a photodetector. The input sensor may further include at least one mirror assembly including at least one mirror. The photoemitter and the photodetector may be arranged on a same side of the opening and the mirror is positioned opposite the photoemitter and the photodetector across the opening. A first housing may be arranged exterior of the cabinet to a first side of the opening. The photoemitter and the photodetector may be positioned within the first housing. A second housing may be arranged exterior of the cabinet to a second side of the opening, across from the first side of the opening. The mirror assembly may be positioned within the second housing. A beam of light emitted from the photoemitter may follow an origination path between the photoemitter and the mirror assembly and the beam of light may follow a return path between the mirror assembly and the photodetector. The origination path may be offset from the return path. The sensing assembly may include a time of flight sensor. The photoemitter and the photodetector may be arranged at an angle relative the conveyor. A first housing may be arranged exterior of the cabinet to a first side of the opening. The first housing may include a first aperture therethrough. One of the photoemitter and the photodetector of the input sensor may be positioned within the first housing in alignment with the first aperture. A second housing may be arranged exterior of the cabinet to a second side of the opening, across from the first side of the opening. The second housing may include a second aperture therethrough. An other of the photoemitter and the photodetector of the input sensor is positioned within the second housing in alignment with the second aperture.

In further examples, the opening is a first feed opening and the conveyor assembly is a first conveyor assembly. The toaster assembly may further include a second feed opening extending through the cabinet and configured to receive the food product. A second conveyor assembly may be positioned within the toaster housing and associated with the second feed opening. The conveyor assembly may include a second conveyor belt. The processor may be operably coupled to the second conveyor and operates the second conveyor between the operating condition with the first belt speed and the idle condition with the second belt speed. The input sensor may further include a mirror assembly comprising at least one mirror, the mirror assembly arranged opposite the opening from the photoemitter and the photodetector. A beam of light emitted from the photoemitter may follow an origination path across the first feed opening between the photoemitter and the mirror assembly and the beam of light may follow a return path across the second feed opening between the mirror assembly and the photodetector. One of the origination path and the return path may be located outside of the cabinet and an other of the origination path and the return path may be located inside the cabinet. The input sensor may be a first input sensor, the photodetector a first photodetector, the photoemitter a first photoemitter, and the mirror assembly a first mirror assembly. The first photoemitter and the first photodetector may be arranged to a first side of the first feed opening and the first mirror assembly is arranged to a second side of the first feed opening opposite the first side. The conveyor toaster may further include second input sensor including a second photoemitter and a second photodetector. The second photoemitter and the second photodetector may be arranged to a first side of the second feed opening A second mirror assembly may be arranged to a second side of the second feed opening opposite the first side of the second feed opening.

The first input sensor may produce a first light beam with a first origination path across the first feed opening between the first photoemitter and the first mirror assembly and a first return path across the first feed opening between the first mirror assembly and the first photodetector, wherein the first origination path is offset from the first return path. The second input sensor may produce a second light beam with a second origination path across the second feed opening between the second photoemitter and the second mirror assembly and a second return path across the second feed opening between the second mirror assembly and the first photodetector. The second origination path may be offset from the second return path. The second input sensor comprising a second photoemitter arranged to a first side of the second feed opening and a second photodetector arranged to a second side of the second feed opening, the second side opposite the first side. The conveyor may be arranged horizontally and partially extends out of the cabinet through the opening.

An example method for operating a conveyor toaster that includes a cabinet, an opening extending through the cabinet and configured to receive a food product, a conveyor assembly positioned within the toaster housing and associated with the feed opening, the conveyor assembly comprising a conveyor belt configured to be operated by a drive motor to transport the food product past a heating element, an input sensor comprising a photoemitter and a photodetector arranged proximate the opening and configured to detect the food product, and a processor operably coupled to the sensing unit and the conveyor assembly, wherein the processor is configured to change between an operating condition with a first belt speed and an idle condition with a second belt speed based upon a signal from the input sensor, wherein the first belt speed is greater than the second belt speed, the method includes operating a conveyor belt in the idle condition at the second belt speed. A food product proximate the opening may be detected based upon a signal from the input sensor. The conveyor belt is operated in the operation condition at the first belt speed. A timer is started to run for a configurable demand period. The signal from the input sensor is evaluated for a change in a status of the signal. In response to a change in the status of the signal, it is determined that an additional food product is not detected proximate the opening. An expiration of the configurable demand period is determined. The conveyor belt is operated in the idle condition at the second belt speed. An identification of a food product type may be received for the food product. Based upon the identification of the food product type, the configurable demand period may be selected. Based upon the identification of the food product type, at least one of the first belt speed and the second belt speed is selected.

DETAILED DISCLOSURE

As provided herein exemplary embodiments of devices and methods for heating food products are constructed with a plurality of independent and adjustable systems whereby a single apparatus can be selectively operated to toast a wide variety of food products including, but not limited to buns, rolls, croissants, bagels, muffins, flatbread, pitas, cakes, pastries, and so forth. In still further exemplary embodiments prepared food products such as sandwiches, burritos, or the like may also be toasted according to the apparatus and method as disclosed herein.

The terms "heat" and "heating" mean, to "make warm or hot". The term "heating food products" means to make food products warm or hot. The terms, heat, heating, and heating food products include heating a food product to a temperature at which the food product is toasted. As used herein, toast, toasted, and toasting all refer to heating a food product to make it crisp, hot, and/or brown by heat or heating.

It is well known that toasted bread products have a distinctly different flavor than do the same products prior to toasting. Toasting also changes a bread product's color and its texture. Toasting and toasted bread products also give off a pleasing aroma. Toasting and its effects are the result of a Maillard reaction.

A conveyor toaster typically arranges at least one conveyor relative to at least one heated platen and the conveyor is configured to drag a food product over the side of the heated platen. The surface of the food product in contact with the side of the platen is thus heated.

Conveyor toasters tend to be constructed to a specification to toast a particular food product or a narrow range of similar food products. Any variability in conveyor belt speed is intended to address discrepancies in the "toasting time" for various food products, rather than demand for the toaster itself. Thus, as long as the toaster is operational, the conveyor assemblies run at "toasting" speeds, regardless of whether food products have actually been loaded into the toaster. As a result, the conveyor belts travel many unnecessary revolutions when the toaster is not actively toasting a food product, resulting in excessive wear and tear on the conveyor assemblies and decreasing the overall lifespan of the conveyor belts and the motive components of the toaster.

The devices and methods as disclosed herein address the above-noted problems as well as others by providing a conveyor toaster in which the conveyor belt speeds are adjustable between higher speeds during high toaster utilization periods and lower speeds during low toaster utilization periods.

Figure 1:
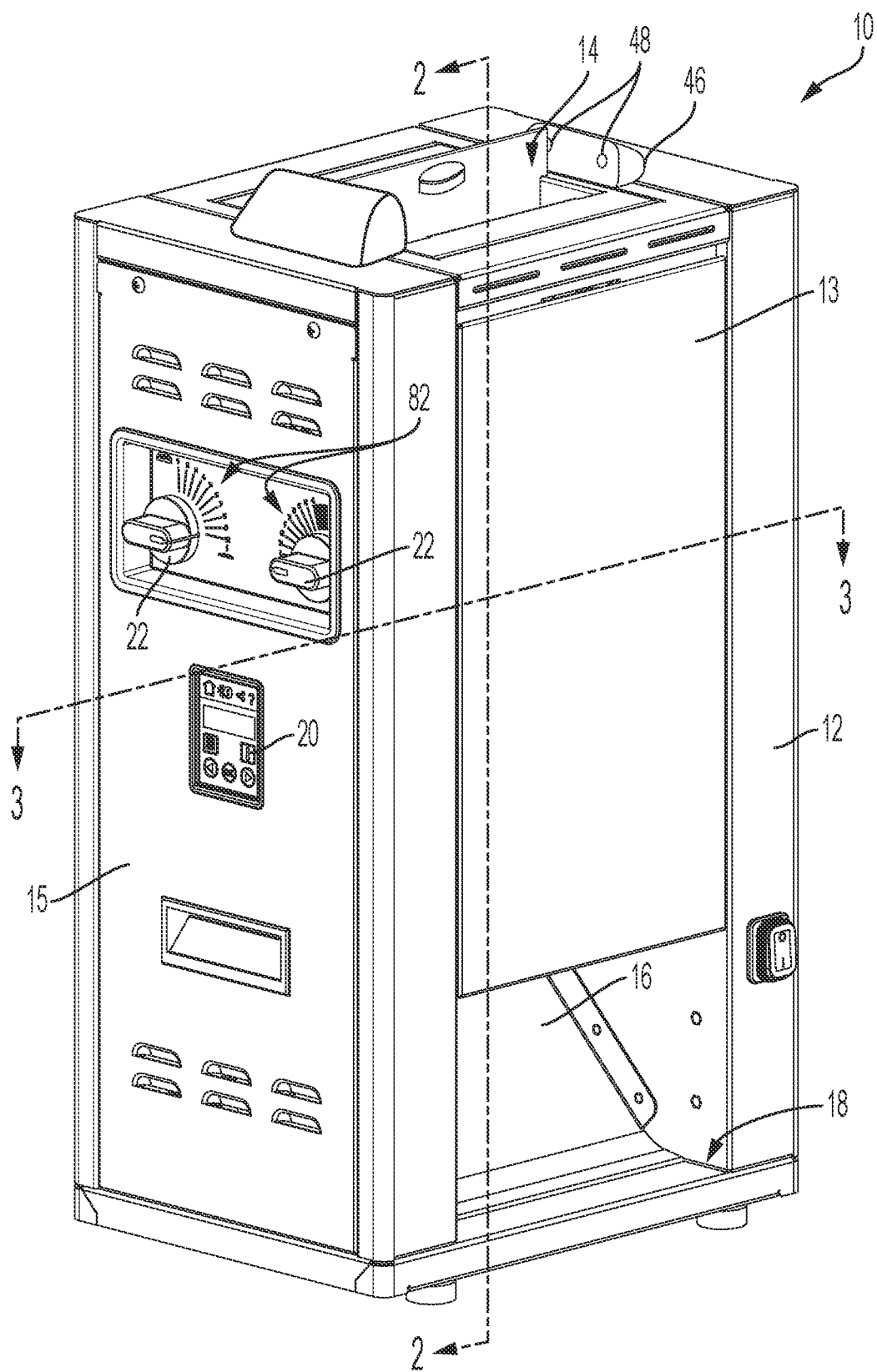
FIG. 1 is a perspective view of an example of a toaster.
Figure 3:
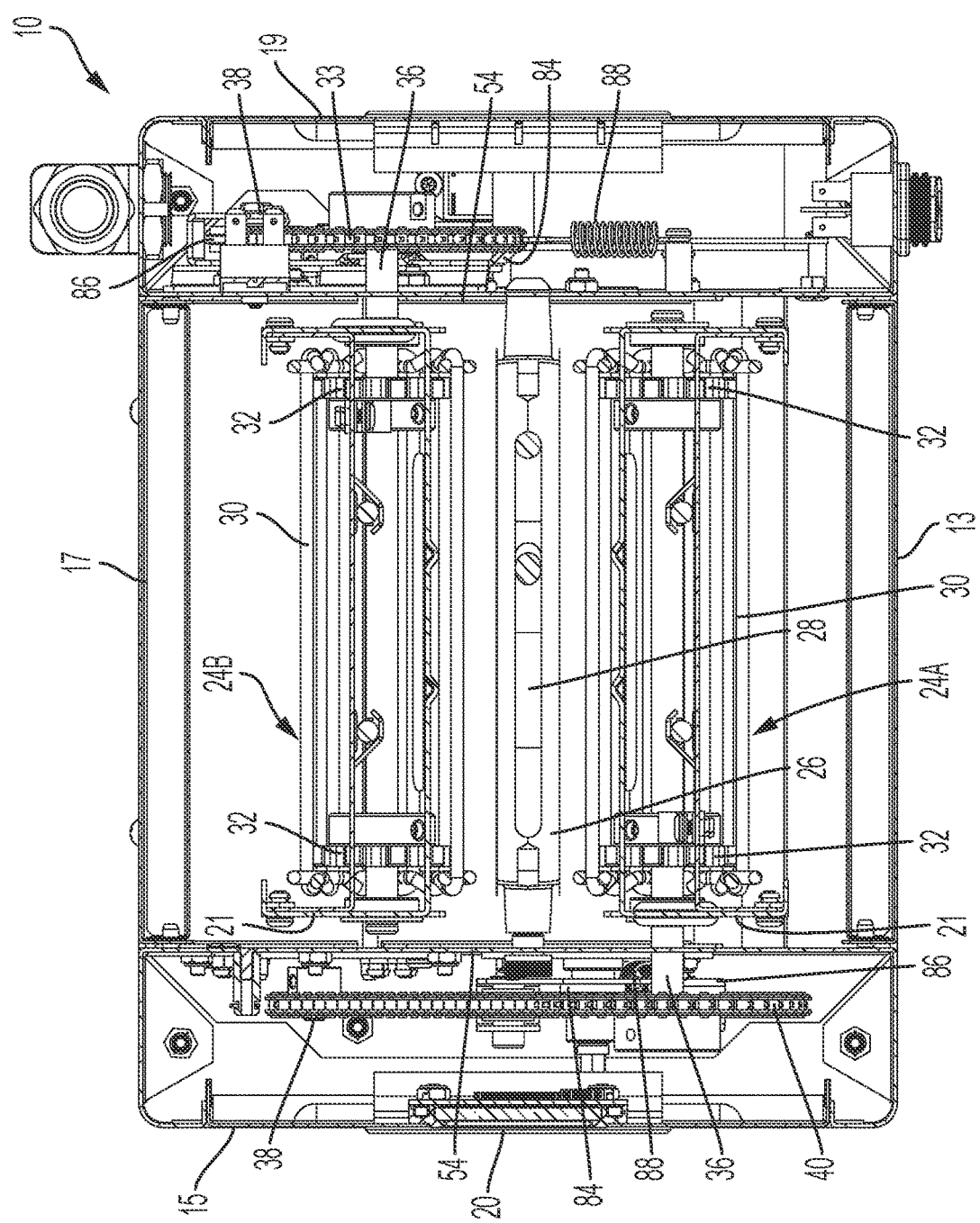
FIG. 3 is a sectional view taken along line 3-3 of FIG. 1.

FIG. 1 depicts an exemplary embodiment of a toaster 10. The toaster 10 is defined by a cabinet 12 and includes a feed opening 14 at the top leading into a toasting path 11. The cabinet 12 is constructed with a front panel 13 and a control side panel 15. As shown in FIG. 3, the cabinet 12 also includes a rear panel 17 and an off-side panel 19. The feed opening 14 is configured to receive pieces of food product to be toasted. In exemplary configurations, the feed opening 14 may be a single opening for use with a single toasting path while in other embodiments the feed opening 14 may be bifurcated (e.g. into feed openings 14A, 14B), for example by a such as to provide two different toasting paths (e.g. 11A, 11B) which may be configured and operated to simultaneously provide two different toasting operations, for example, the toasting the heel and the crown of the bun and/or a middle club portion of the bun. Further examples and details of conveyor toasters as may be used with the disclosure as provided herein are described in U.S. patent application Ser. No. 15/859,860, entitled "Toaster with Adjustable Conveyor," which is incorporated by reference herein in its entirety.

A conveyor assembly 24 as described herein moves a food product received through the feed opening 14 along the toasting path 11 across a platen 26 to toast the food product. The toasted food product exits the toaster 10 by way of a discharge slide 16 which directs the toasted food product to the discharge port 18 at the bottom of the toaster 10, exemplarily defined below the front panel 13. However, it will be recognized that the discharge port 18 may be oriented to dispense toasted food products through a different side of the toaster 10, or even out of the bottom.

The toaster 10 further includes one or more input devices, which may exemplarily be in the form of a touch-sensitive display 20 and/or dials 22. It will be recognized that various input devices may be used with the embodiments described herein, including touch-sensitive displays, dials, buttons, switches, or other input devices as will be recognized by a person of ordinary skill in the art.

Figure 2:
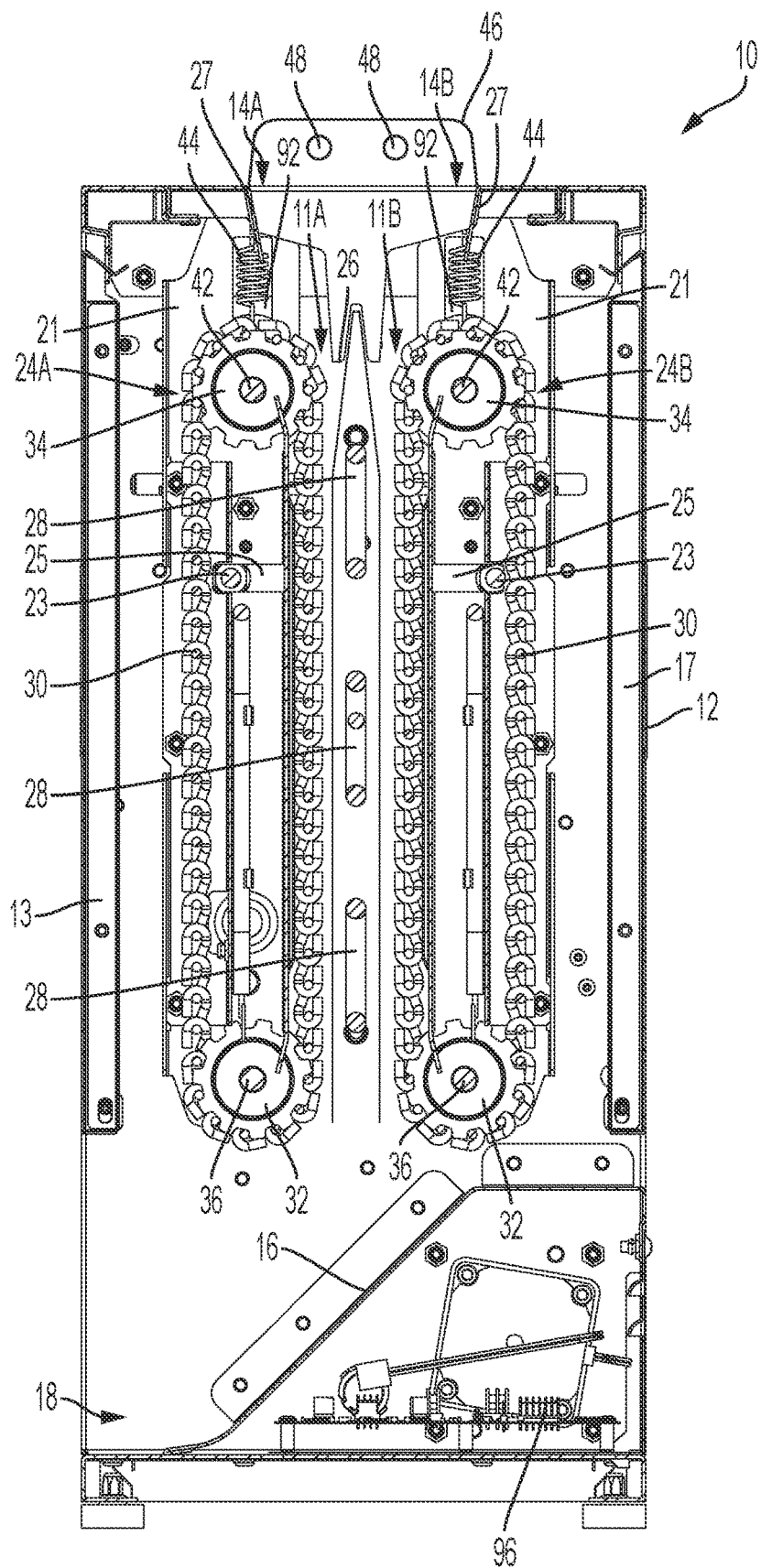
FIG. 2 is a sectional view taken along line 2-2 of FIG. 1.

FIG. 2 is a sectional view of the toaster 10 taken along line 2-2 of FIG. 1. In this view, two conveyor assemblies 24A and 24B are depicted relative to the platen 26. The platen 26 includes heating coils 28 which may exemplarily be electric heating elements and which are controlled to heat the platen 26 to a set or predetermined temperature.

The conveyor assemblies 24A, 24B each include a bracket 21. The bracket 21, as will be detailed further herein, supports a conveyor belt 30. The bracket 21 is movable relative to the platen 26 in order to adjust a distance between the conveyor belt 30 and the platen 26. Adjustment shafts 23 which are connected to the dials 22, depicted in FIG. 1, extend through the toaster 10 and within slots 25 in the bracket 21. In this manner, the bracket 21 is movable relative to both the shaft 23 and the platen 26 to adjust the spacing between the conveyor belt 30 and the platen. Conveyor belts 30 may take various forms as known in the field of toasters, including, but not limited to Teflon coated belts, wire belts, wire and silicone belts, wire and metal plate belts, and solid metal plate belts. The aforementioned examples of conveyor belts are exemplary listed in order from most flexible to least flexible.

The conveyor belts 30 respectively move around drive gears 32 and slave gears 34. The drive gears 32 are rotatably connected to the bracket 21 and the slave gears 34 are movably connected to the bracket 21 as described in further detail herein. The drive gears 32 are respectively secured to drive shafts 36. As exemplarily depicted in FIG. 3, which is a cross-sectional view of the toaster 10 taken along line 3-3 of FIG. 1, the respective drive shafts 36 are respectively driven by drive motors 38. In a non-limiting embodiment, a drive chain 33 may motively connect the drive motor 38 to the drive shaft 36. In an exemplary embodiment, the drive motors 38 may be electrical stepper motors. As previously noted in exemplary embodiments a separate drive motor 38 is provided for each conveyor assembly 24.

The rotation of the drive gears 32 causes the conveyor belt 30 to move and the conveyor belt 30 at an opposite end rotates about the slave gear 34 which rotates about a slave shaft 42. Tensioning springs 44 are connected between respective spring mounts 27 on the brackets 21 and the ends of the slave shafts 42 and/or the slave gears 34. It will be recognized a tensioning spring 44 may be connected to a connector, for example, a plate that is in turn connected to the slave shaft 42 and/or the slave gear 34. The tensioning springs 44 provide a bias force and tension on the conveyor belt 30 as it rotates about the slave gear 34 and drive gear 32. It will be recognized in the present embodiment and in further embodiments disclosed herein that a compression force against a piece of food being toasted by the toaster 10 may exemplarily be defined by a conveyor belt placed in tension by the tensioning springs and a conveyor belt-platen gap. Through embodiments disclosed herein, this compression force can be selectively adjusted to toast a variety of types of food with different toasting qualities and characteristics. Embodiments as disclosed herein exemplarily provide for parallel alignment and movement of the conveyor belt relative to the platen to provide an even conveyor belt-platen gap and even compression over the toasting process.

As will be discussed in further detail herein, the toaster 10 includes at least one input sensor 40 that is arranged about the opening 14. The input sensor 40 exemplarily includes a housing 46 which protects the electronics and/or other components held therein. The housing 46 may include apertures 48 through which signals, for example, light, are transmitted. In an example, there is a pair of housings 46 arranged at opposing sides of the opening 14 between which the signals, e.g. light, are transmitted. It will be recognized that different arrangements of one or more input sensors 40 may be disposed within the housings 46. The housings 46 exemplarily include a pair of apertures 48, with an aperture aligned with each of the feed openings 14.

Figure 5:
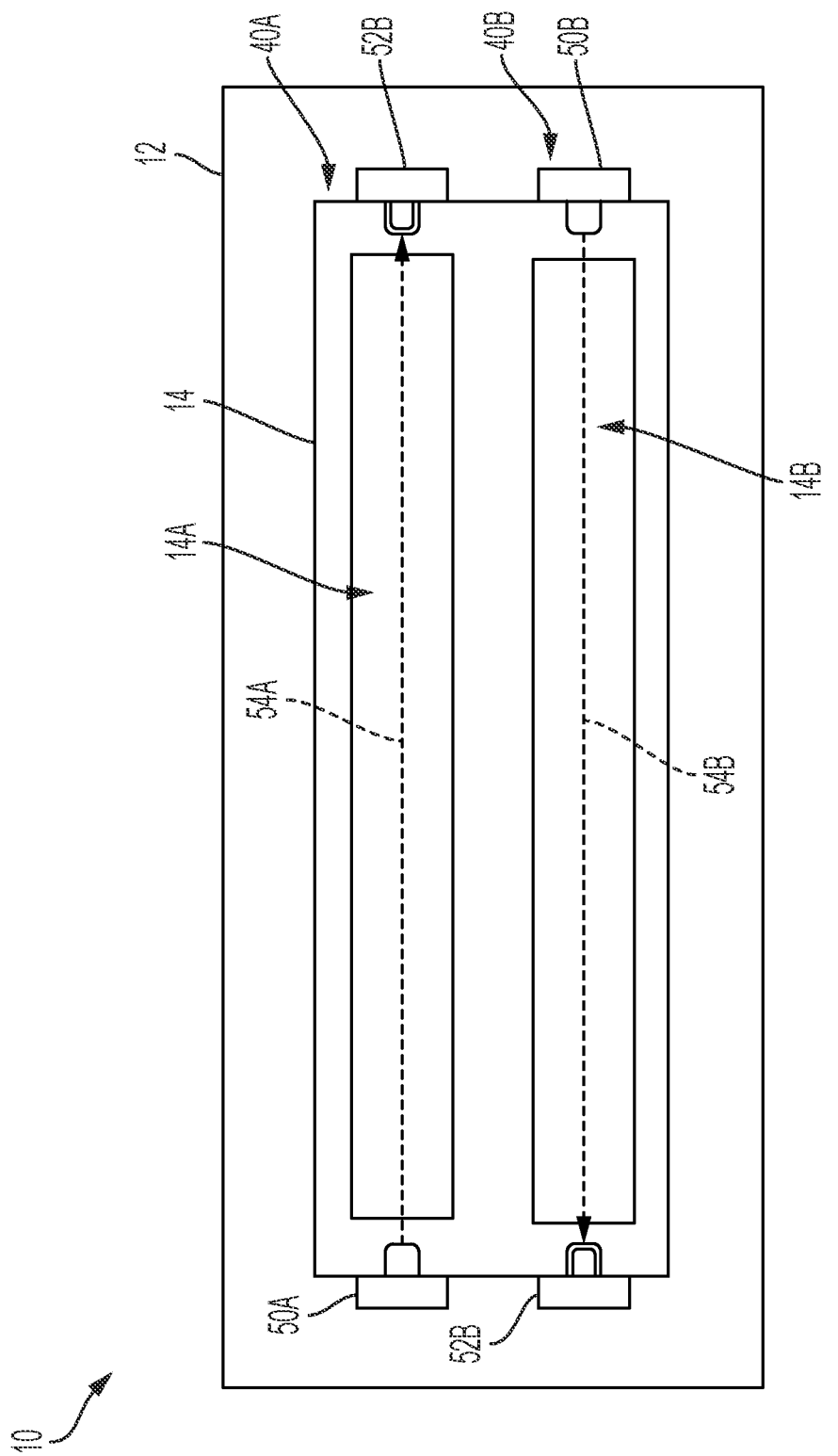
FIG. 5 is a schematic top view of an example arrangement of the toaster.
Figure 6:
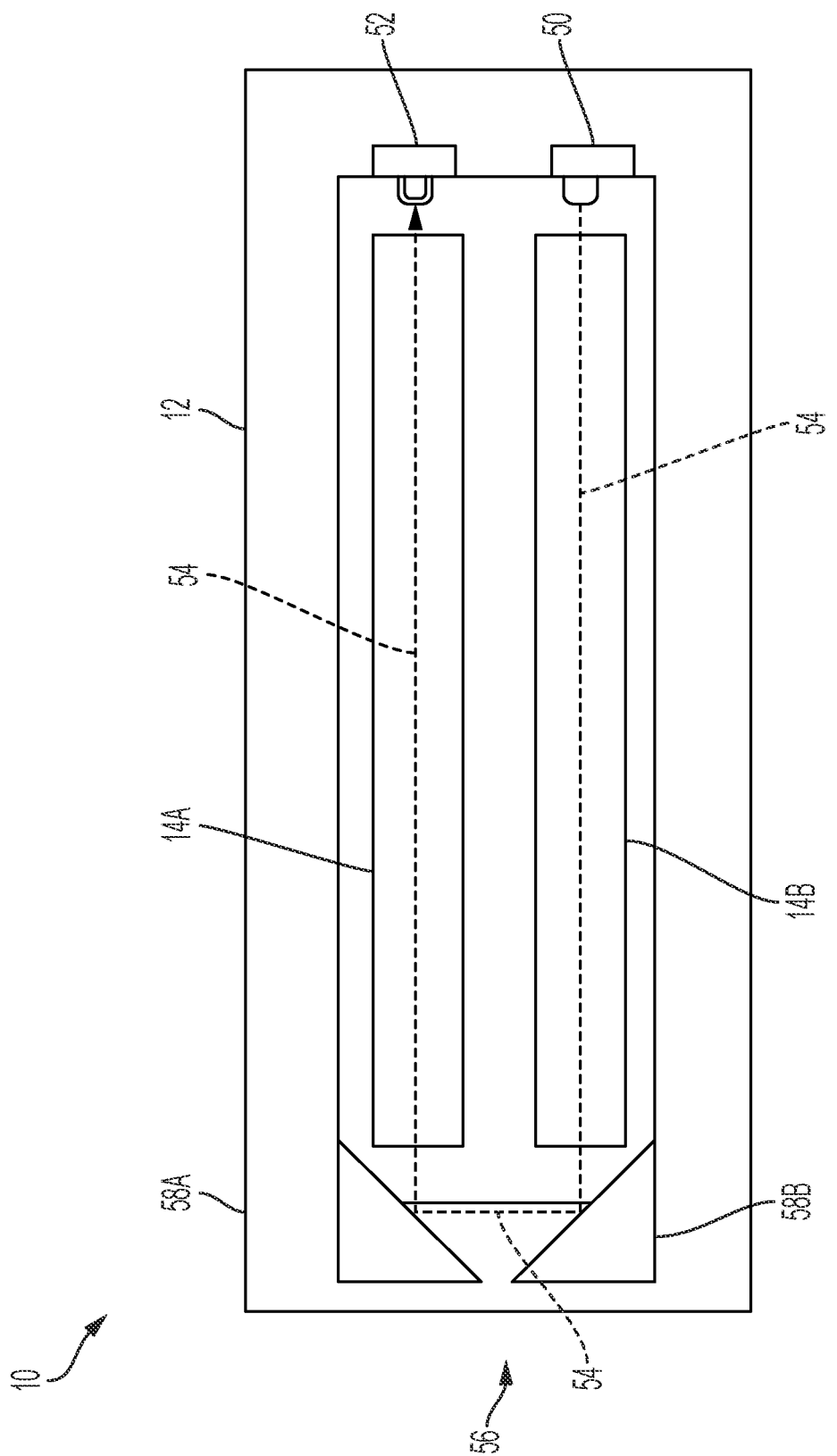
FIG. 6 is a schematic top view of an additional example arrangement of the toaster.
Figure 7:
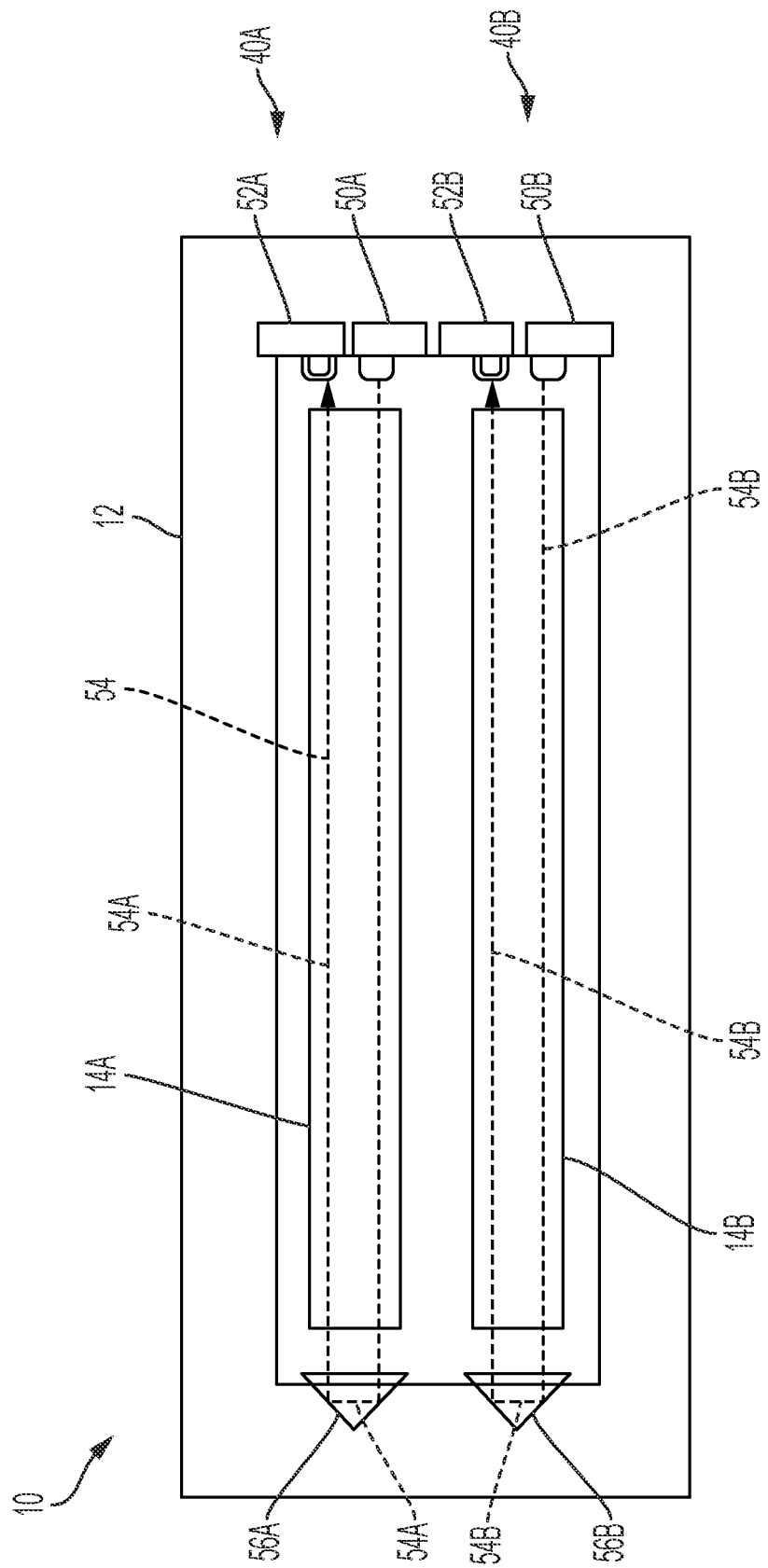
FIG. 7 is a schematic top view of a further example arrangement of the toaster.

While examples of the components and arrangements of the input sensors 40 are schematically provided in FIGS. 5-7, as an example, each housing 46 includes two of light emitters 50 (e.g., a light-emitting diode (LED), an infrared emitter) or light collectors 52 (e.g., a photoelectric or infrared photodetector). In the example depicted in FIGS. 1 and 2, a light emitter 50 and a light collector 52 are each arranged on opposite sides of each of the feed openings 14. That is, a light emitter 50A may be positioned within the housing 46 relative to the aperture 48A in alignment with feed opening 14A and across from the light collector 52A (FIG. 5). A light collector 52B may be positioned within the housing 46 relative to the aperture 48B in alignment with feed opening 14B and across from the light emitter 50B (FIG. 5). However it will be recognized that in other examples, both light emitters 50A, 50B may be located within the same housing 46, and both light collectors 52A, 52B may be located within the same housing 46 opposite the opening 14.

As will be described in further detail herein, the input sensors 40 operate to detect the food product entering the opening 14. The input sensors 40 may exemplarily be positioned as depicted in FIG. 1 at a position above the opening 14 through the cabinet 12. The input sensors 40 may comprise a line-break sensor where a beam of visible or invisible (e.g. infra-red spectrum) light is emitted from a light emitter 50 and received by a light collector 52. When the food product comes between the light emitter 50 and the light collector 52, the beam of light from the light emitter 50 doesn't reach the light collector 52 and a signal indicative of the same is provided from the input sensor 40 to the processor 96. The input sensors 40 thus detect the food product before it enters the cabinet and before the food product comes in contact with the conveyor belt 30 and/or the platen 26 within the cabinet 12. Meanwhile, the processor 96, in response to the signal from the input sensor 40 can operate the drive motors 38 to increase the speed of the conveyor assemblies 24 to move the conveyor belts 30 at a predetermined toasting speed. Detection of the food product before it enters the cabinet 12 may provide some lead time to initiate the increase in speed.

Figure 4:
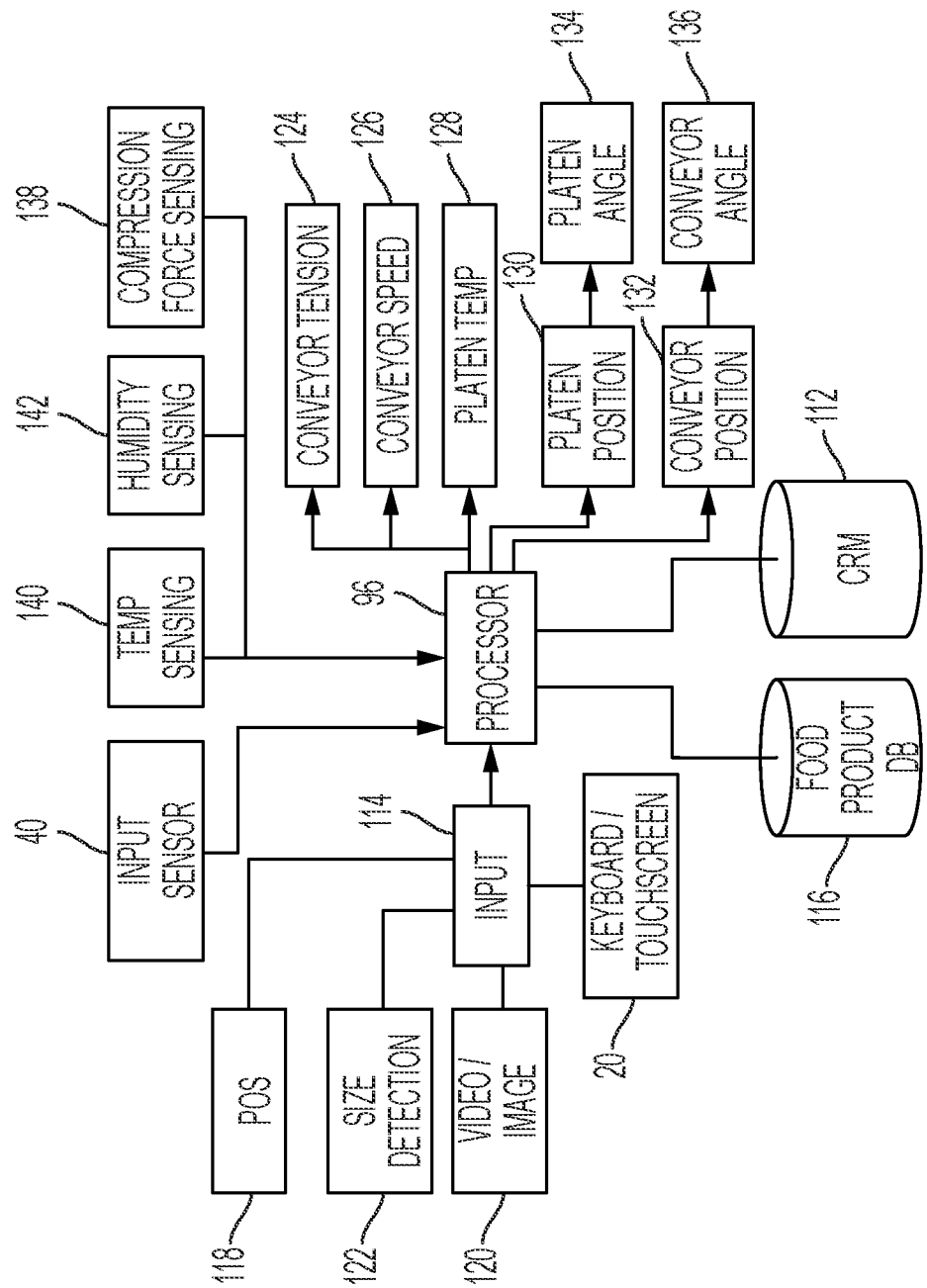
FIG. 4 is a system diagram of an adjustable toaster.

FIG. 4 is a system diagram that depicts exemplary functions and operations of a toaster 10. In the exemplary embodiment, the functions and operations of the toaster 10 are controlled and carried out by a processor 96 as used herein, the term processor means any of a variety of known controllers or microcontrollers integrated circuits and/or printed circuit boards comprising electronics to read and execute computer-readable code to produce instructions and control commands as described in further detail herein.

The processor 96 is communicatively connected to a computer-readable media 112 which stores computer-readable code that is executable by the processor to carry out the functions and operations as described in further detail herein.

The processor 96 is further connected to one or more input devices 114 which are used to exemplarily input a type of food product to be toasted and/or to input specific controls or instructions for future toasting of food products. A keyboard/touchscreen interface, for example, as depicted in FIG. 1 as part of a display, exemplarily a touch-sensitive display 20, may be used to select a variety of food products the dimensions, qualities, and toasting requirements of which are stored in a food product database 116.

The user interface on the touch-sensitive display 20 exemplarily is configured to receive user control inputs for conveyor belt speed and platen temperature. These may be available to the user through prompts or menu navigation, or other input schemas. Furthermore, the user interface may present and enable user selection of a variety of preset toasting configurations. In embodiments, these may be common setting combinations of temperature and speed. For example, a high output mode may use a high temperature and conveyor speed, while an efficiency mode may use a lower temperature and speed. Based upon a use pattern of a kitchen, these may be characterized into a "breakfast", "lunch", and "late-night" settings. In a still further exemplary embodiment, the preset configurations may identify particular bread types (e.g. bun, bagel, English muffin, toast). Each of these bread types may have a particular combination of one or more of: toaster gap, belt tension, conveyor speed, and platen temperature for desired toasting of that particular baked product. In an embodiment, these setting combinations may be stored in the food product database 116. As will be provided in further detail herein, these operation configuration settings may further include settings regarding an idle or low energy operational mode in which the toaster enters based upon detected incoming food products.

Once a preset operation configuration is selected, the toaster 10 may operate according to the selected stored combination of settings and may further operate the display 20 (or another display) to provide a visual indication of the currently selected preset operation. In still further embodiments, the user may control the operation of other functions of the toaster 10, for example, a temperature of a heated landing zone in the area of the discharge port 18 (FIG. 1) or a platen temperature for a back side heater within the toaster.

The input device 114 may further be a communicative connection to a point of sale (POS) system 118 of the kitchen. The POS system 118 may be local to the kitchen or may be a networked or cloud-computing based information system that receives and manages customer orders. The POS system 118 may include a register, kiosk, or computer or mobile ordering interface whereby a customer order is received. The POS system 118 may further track and coordinate the preparation and assembly of items in the order. In an exemplary embodiment, this may include providing instructions to the toaster regarding the type of toasted baked good and/or toaster settings for the order. In another embodiment, the POS system 118 may provide a queue of toasting operations from which the toaster can adjust to the required settings for each operation in the queue.

In still further exemplary embodiments, video and/or image capturing 120, for example, associated with the feed opening can be used, in conjunction with image processing techniques and apparatus to identify the food product being inserted into the feed opening 14. Once the food product has been identified, the appropriate toaster setting and/or toasting profile from the food product database 116 may be accessed by the processor 96. In a still further exemplary embodiment, size detection 122 is used to identify or gather additional information regarding the bread product to be toasted. As used herein size detection may be a detection of any physical property of the bread product, which may include a dimension, shape, volume, weight, density, or other property as may be recognized in view of this disclosure. For example, optical (e.g. lasers or infrared) or ultrasound, or other dimension detection techniques in association with the opening 14 may be used to identify dimensions, volume, and/or shape of the food product. In some embodiments, measurement of one or more of these may be indicative of the food product itself, particularly when food products to select from are varied in these parameters or when a food product has a particular known size and/or shape. In still further embodiments, the weight and/or density of the food product may be identified in addition to the dimension detection described above, this can be a further distinguishing characteristic between otherwise similarly dimensioned food products. This may exemplarily be done with the use of a load cell arranged in relation to the opening 14.

The processor 96, having received an identification of the food product to be toasted, accesses the food product database 116 to retrieve information regarding the food product, and particularly a toasting profile for the food product. The toasting profile may include a variety of adjustments made to the toaster system to achieve a predetermined standard of toasting for the food product. As previously described, embodiments of the toaster include multiple systems which are independently adjustable in order to accommodate a wide variety of food products and toasting requirements of such food products. Therefore, according to the toasting profile, the processor may adjust the conveyor tension at 124, for example by adjusting the position of the mounting head 110 of the tension spring 44, the processor 96 may adjust the conveyor speed 126, for example by operating one or more of the drive motors 38 to a predetermined speed. In an exemplary embodiment, a system that includes two or more parallel toasting systems, for example as depicted in FIGS. 2 and 3, the drive motors 38 may be operated at different speeds so as to toast two related food products simultaneously or to toast two food products with different toasting requirements in the same amount of time.

The processor 96 may control or operate the platen temperature 128. This may be performed by operating the heating coil 28 internal to the heated platens.

As described above, the processor 96 may further adjust the platen position 130 and/or the conveyor position 132 such as to control the toaster gap distance D. This may be exemplarily performed by moving the top and/or bottoms of the platen and/or the conveyor assembly for example by rack and pinion or linear actuator. As a result of the platen and the conveyor being individually positionable at both the top and bottom of these respective devices, adjustment of the platen position 130 and the conveyor position 132 can further result in adjustment of the platen angle 134 and the conveyor angle 136 for example by moving the top and/or bottom of the platen and/or conveyor to a position different from the respective other end.

It is further recognized that these adjustments may also be made intra-toasting such as to create further toasting effects or to achieve a predetermined toasting amount or color. For example, while the identified food product is being toasted, the processor 96 may adjust the conveyor tension 124 to increase or reduce the crushing force against the food product, forcing the food product against the platen in order to change the toasting effect achieved.

Additionally, the processor 96 may further receive feedback from one or more sensors located within the toaster to provide information regarding the actual toasting conditions achieved within the toaster. This feedback may be used by the processor to adjust the operation of the toaster in a manner so as to achieve the predetermined toasting qualities. The processor 96 may receive data indicative of compression force sensing 138 temperature sensing 140, and humidity sensing 142. Such sensors may be respectively located internal to the toaster in a manner so as to gather the associated information. For example, temperature sensing and/or humidity sensing may be used for example to identify if a food product was frozen, or dry, or more moist than normally expected and the processor 96 may adjust the operation of the toaster to remediate these conditions of the food product during operation of the toaster.

As referenced above, the processor 96 is further configured to receive signals from the one or more input sensors 40. While various configurations of the input sensors 40 are described herein, the processor 96 may generally operate to carry out the method as depicted and described with respect to FIG. 11. That is, the processor 96 may operate to control the one or more drive motors 38 between an operational speed and an idle speed dependent upon the one or more signals received from the one or more input sensors 40. It will be recognized that for each input sensor 40, the processor 96 is provided with a signal indicative if the light collector 52 has received the light from the light emitter 50 or has not received the light from the light emitter 50. While remaining within the same operation and method, such signals indicative of the light collector receiving or not receiving the light from the light emitter may be used by the processor in different variations of carrying out the control and operation as described herein.

In some implementations, the input sensors 40 as described herein may be capable of installation on existing toasters, that is, the sensing components may be contained within a retrofittable module that can be mounted on an existing toaster. The sensing components are communicably coupled to the processor 96, and upon detection of a food item, the processor 96 acts to increase the speed of one or both conveyor belts 30 from a lower conveyor speed utilized during periods of low toaster demand to a higher conveyor speed utilized during periods of high toaster demand. In this way, excess wear and tear on the conveyor assemblies 24 is minimized, and the lifetime of the toaster 10 is extended FIGS. 5-7, and 9-10, are schematic views of examples of arrangements of the input sensors 40 on a toaster 10. It will be recognized that FIGS. 5-7, and 9-10, are merely examples of the arrangements of and that other arrangements of input sensors (e.g. reversing element positions) are within the scope of the present disclosure. The toaster 10 includes an opening 14 through the cabinet 12 and two feed openings 14A, 14B into the respective feed paths 11A, 11B as depicted in FIGS. 1 and 2. It will be recognized that the housings 46 are not shown so as to provide a better view of the components of the input sensors 40.

In FIG. 5, input sensor 40A is arranged with a light emitter 50A and light collector 52A on opposite sides of the feed opening 14A. The light emitter 50A emits a beam 54A of light towards the light collector 52A. A light emitter 50B and light collector 52B are arranged on opposite sides of the feed opening 14B. The light emitter 50B emits a beam 54B of light towards the light collector 52B. It will be recognized that while the toaster 10 depicted in FIG. 5 includes two feed openings 14A, 14B, that other toasters may include a single feed opening or other positioning of feed openings as described in further detail herein.

When no food is present in the feed opening 14A, the beam 54A passes from the light emitter 50A to the light collector 52A and the input sensor 40A provides the processor 96 with a signal of no food product detection. If a piece of food is introduced to the feed opening 14A, the piece of food will break the beam 54A and the input sensor 40A provides the processor 96 with a signal indicative of the detection of food product. Received light at the light collector 52A may result in transmission of a signal to the processor 96. Lack of emitted light received at the light collector 52A may interrupt this signal, which is subsequently interpreted by the processor 96 as detection of a food item. In FIG. 5, the input sensor 40A is arranged across the feed opening 14A and the input sensor 40B is arranged across the feed opening 14B. Thus input sensor 40A provides a signal to the processor 96 indicative of food products entering the feed opening 14A while the input sensor 40B provides a signal to the processor 96 indicative of food products entering the feed opening 14B. As noted with respect to FIG. 2, if separate conveyor assemblies 24 are each associated with the separate feed openings 14A, 14B, or associated feed paths 11A, 11B, then the processor can operate to control the conveyor assemblies 24A, 24B between operational and idle conditions individually based upon the signals from the input sensors 40A, 40B.

FIG. 6 is an example of the toaster 10 with an input sensor 40. The input sensor 40 is arranged with the light collector 52 arranged adjacent to a feed opening 14A and the light emitter 50 arranged adjacent to a feed opening 14B. In an example, the light emitter 50 and the light collector 52 are positioned within the same housing (not depicted). Opposite the light emitter 50 and the light collector 52 is a mirror assembly 56. The mirror assembly 56 exemplarily includes angled and opposed mirrors 58A, 58B. The mirrors 58A, 58B are exemplarily angled towards each other at a 45 degree angle. The mirror assembly 56 may be positioned within a housing (not depicted) as shown and described above. In this arrangement, a beam 54 of light projected across the feed opening 14B from the emitter 50 strikes the mirror 58B and reflects the beam 54 to the mirror 58A. The mirror 58A reflects the beam 54 across the feed opening 14A to the light collector 52. The beam 54 thus is projected across both feed openings 14A, 14B. In use, entry of a food product into either of the feed openings 14A, 14B will break the beam 54 resulting in a change in the signal transmitted to the processor 96. The processor can subsequently interpret this change as indicative of food product entering the toaster. In this arrangement, both feed openings 14/feed paths 11 can be monitored by an input sensor 40 and the processor 96 can control both conveyor assemblies 24 between the same operational and idle conditions. Thus no food products entering either feed opening 14 will result in an idle condition of both conveyor assemblies 24, while the input sensor 40 detects food product entering at least one feed opening 14, and thus both conveyor assemblies 24 would be controlled to the operational condition.

FIG. 7 is an example of the toaster with an input sensor 40A, 40B arranged for each feed path 11A, 11B. In FIG. 7, the light emitters 50 are arranged on the same side of a feed opening 14 as the light collector 52 to which it emits a beam 54. The light emitter 50 and the light collector 52 for the feed path 11 may thus be within a single housing (not depicted). Opposite the light emitter 50 and the light collector 52 is a mirror assembly 56 that received the beam 54 of light from the light emitter and returns the beam 54 of light to the light collector 52. In an example, the return path of the beam 54 from the mirror assembly 56 is offset from the origination path of the beam 54 from the light emitter 50 to the mirror assembly 56. This offset effectively provides two beam paths across the feed opening 14 and thus additional sensitivity by the input sensor 40 to food products incoming into the feed opening 14. In an example, the toaster may be configured with a feed opening 14 that is dimensioned to accommodate a range of food product thicknesses (e.g. requiring different gap distances or conveyor tensions). The two beam paths across the feed opening 14 may help to detect food products on the low end of this thickness range or food products entering the feed opening 14 at an angle.

Figure 8:
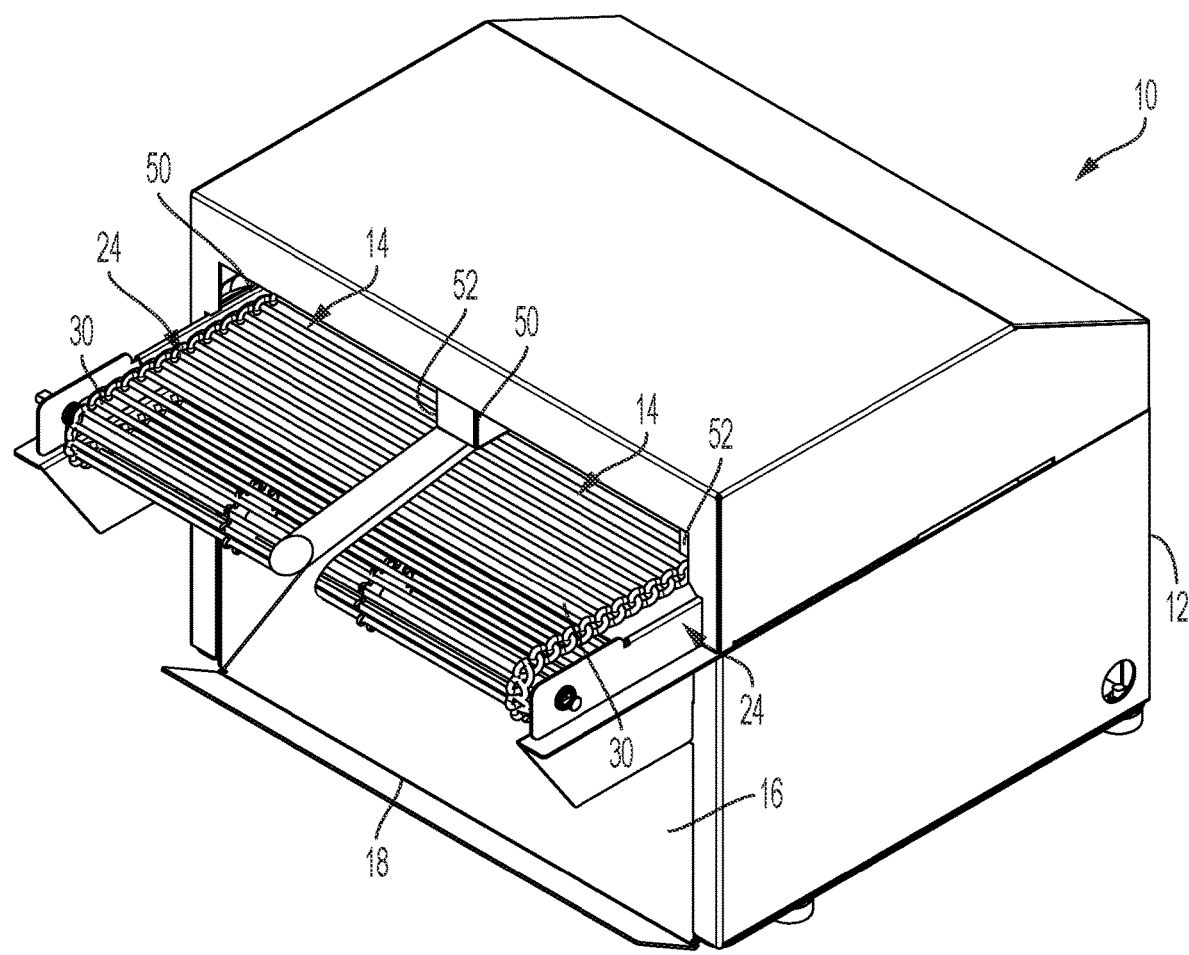
FIG. 8 is a perspective view of an additional example of a toaster.

FIG. 8 presents a further example of a toaster 10, it will be recognized that like reference numerals are used herein to identify similar components as described above. The toaster 10 of FIG. 8 is exemplarily arranged with a generally horizontal conveyor assemblies 24. It will be recognized that while vertical and horizontal toaster examples have been shown herein, that further angles of the toaster conveyor and/or platen may be used within the scope of the present disclosure. The toaster 10 is defined by a cabinet 12 and includes feed openings 14 through which the conveyor assemblies 24 extend. In operation, a food product is placed on the conveyor assembly 24 and moved into the cabinet 12 through the feed opening 14. Once toasted, the food product exits the toaster 10 by way of discharge slide 16 to a discharge port 18.

Figure 9:
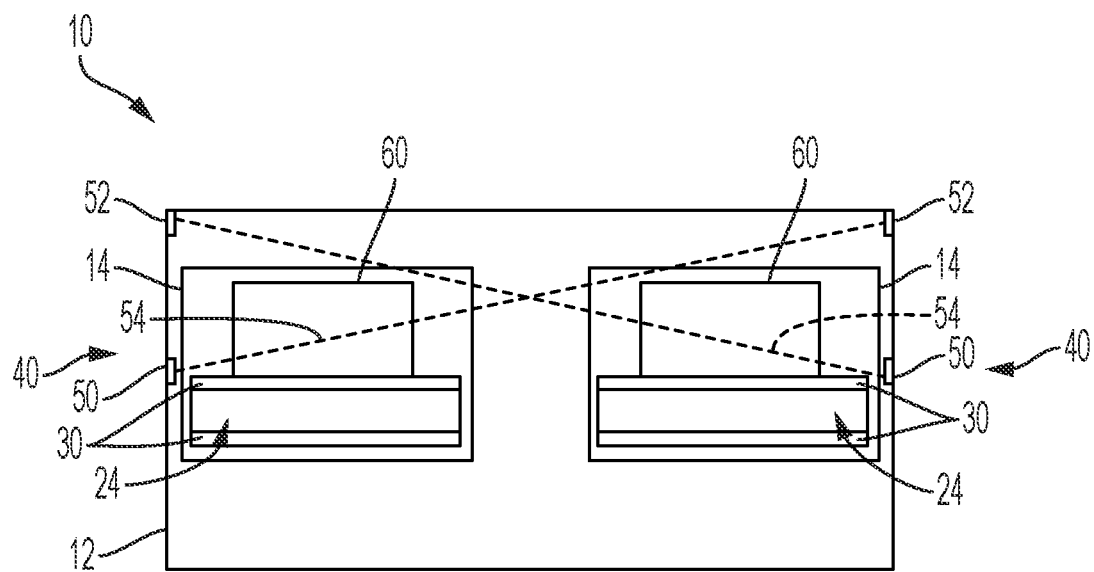
FIG. 9 is a schematic front view of an arrangement of the [input sensors] of a toaster.
Figure 10:
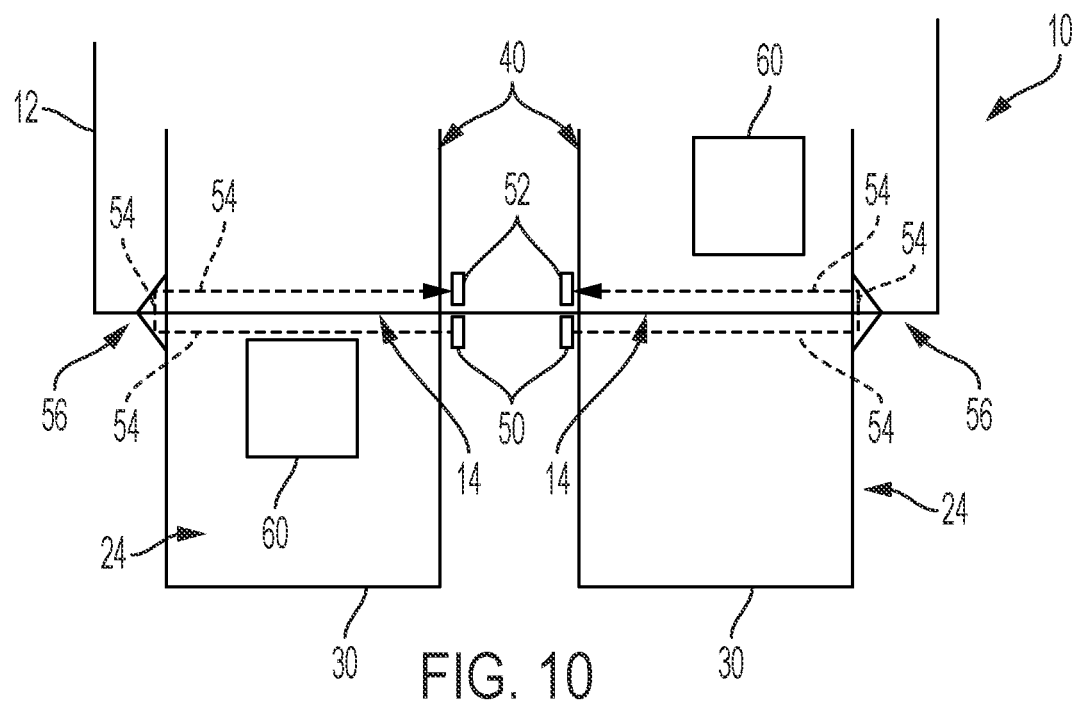
FIG. 10 is a schematic top view of an additional arrangement of the [input sensors] of a toaster.

FIGS. 9 and 10, further to the examples provided in FIGS. 5-7, provide further schematic examples of the arrangement of the input sensors 40. It will be recognized that these further examples may be applied to any of a variety of toaster configurations, including, but not limited to those depicted in FIGS. 1 and 8. FIG. 9 is a font schematic view of a toaster 10. Food products 60 are positioned on conveyor belts 30 of the conveyor assemblies 24. Input sensors 40 include light emitters 50 and light collectors 52. The input sensor 40 is arranged to produce the light beam 54 between the light emitter 50 and the light collector 52 at an angle across the conveyor belt 30.

The input sensor 40 may be upwardly angled or downwardly angled. The angled input sensor 40 may achieve two functions. First, the beam 54 extends across the conveyor belt 30 at a variety of heights, thus providing improved sensitivity for detecting food products across a range of food product thicknesses. In an example, the lower end of the input sensor 40 (e.g. light emitter 50 in FIG. 9) is located at or near the surface of the conveyor belt 30. The beam 54 angles to a height that is at or near a maximum expected food product thickness when the beam 54 is in alignment with an interior edge of the conveyor belt 30. Secondly, an input sensor 40 that is angled enables the input sensor 40 to be sensitive to food product traveling on one conveyor 30, but not on the other. In such an example, the beam 54 has reached a height that is above the maximum expected food product thickness when the beam 54 is in alignment with an interior edge of the opposite conveyor belt 30. In one or both of these arrangements (recognizing that in examples both criteria may be achieved), the beam 54 of the input sensor 40 is broken by a food product 60 traveling on one conveyor belt 30, but not broken by a food product 60 traveling on the other conveyor belt 30.

FIG. 10 is a schematic top view of a toaster 10. The conveyor assemblies 24 include conveyor belts 30 which extend into the toaster 10 through feed openings 14 through the cabinet 12. The conveyor belts 30 support food products 60 and are operated to move the food products into the cabinet 12 for toasting by the toaster 10. Input sensors 40 are each arranged about the feed openings 14. The input sensor 40 includes a light emitter 50, a light collector 52 and a mirror assembly 56. The input sensors 40 produce beams 54 of light from the light emitter 50 which is reflected by the mirror assembly 56 to be received by the light collector 52. As described above, the return path of the beam 54 from the mirror assembly 56 to the light collector 52 is offset from the origination path of the beam 54 from the light emitter 50 to the mirror assembly.

In a further example disclosed by FIG. 10, the input sensor 40 positioned relative to the feed opening 14, such that the origination path (or the return path) of the beam 54 is located outside of the cabinet, while the return path (or origination path) of the beam 54 is located inside of the cabinet. In such an arrangement, the offset between the origination path and the return path are used to provide a more informative input sensor signal.

On the left-hand side of FIG. 10, a food product 60 is located on the conveyor 30 outside of the cabinet 12. The beam 54 of the input sensor 40 is currently not broken and the input sensor 40 is operates to provide a signal to the processor 96 that is subsequently interpreted as no detection of food product. As the food product moves towards the cabinet 12, the food product 60 will break the origination path of the beam 54, resulting in a change in the signal transmitted to the processor 96. The processor 96 can subsequently interpret this change as indicative of food product 60 entering the cabinet 12. This change informs the processor 96 of incoming food product 60 before the food product enters the cabinet 12, and the processor 96 can operate to adjust the operation of the toaster as described herein accordingly.

The condition of a broken beam 54 will persist until the food product 60 has completely entered the cabinet 12, for example as depicted on the right-hand side of FIG. 10. As shown in that condition, the beam 54 is no longer broken, which results in a change in the signal transmitted to the processor 96. The processor can subsequently interpret this change as indicative of food product 60 having completely entered the cabinet 12. This change informs the processor 96 that the food product is currently undergoing toasting, and the processor 96 can operate to adjust the operation of the toaster as described herein accordingly.

In a further example, the toaster 10 may be configured with an auto-loading apparatus (not depicted) which operates to hold a queue of food products 60 and to evenly and repeatedly dispense the food products 60 onto the conveyors 30. In an example, auto-loading apparatus may dispense the food products 60 onto the conveyors 30 with an increment between adjacent food products that is less than the gap between the origination path and the return path of the beam 54. In this manner, the input sensor 40 will continue to report a beam broken signal to the processor 96 until the auto-loading apparatus has finished dispensing food products 60 onto the conveyor 30.

Figure 11:
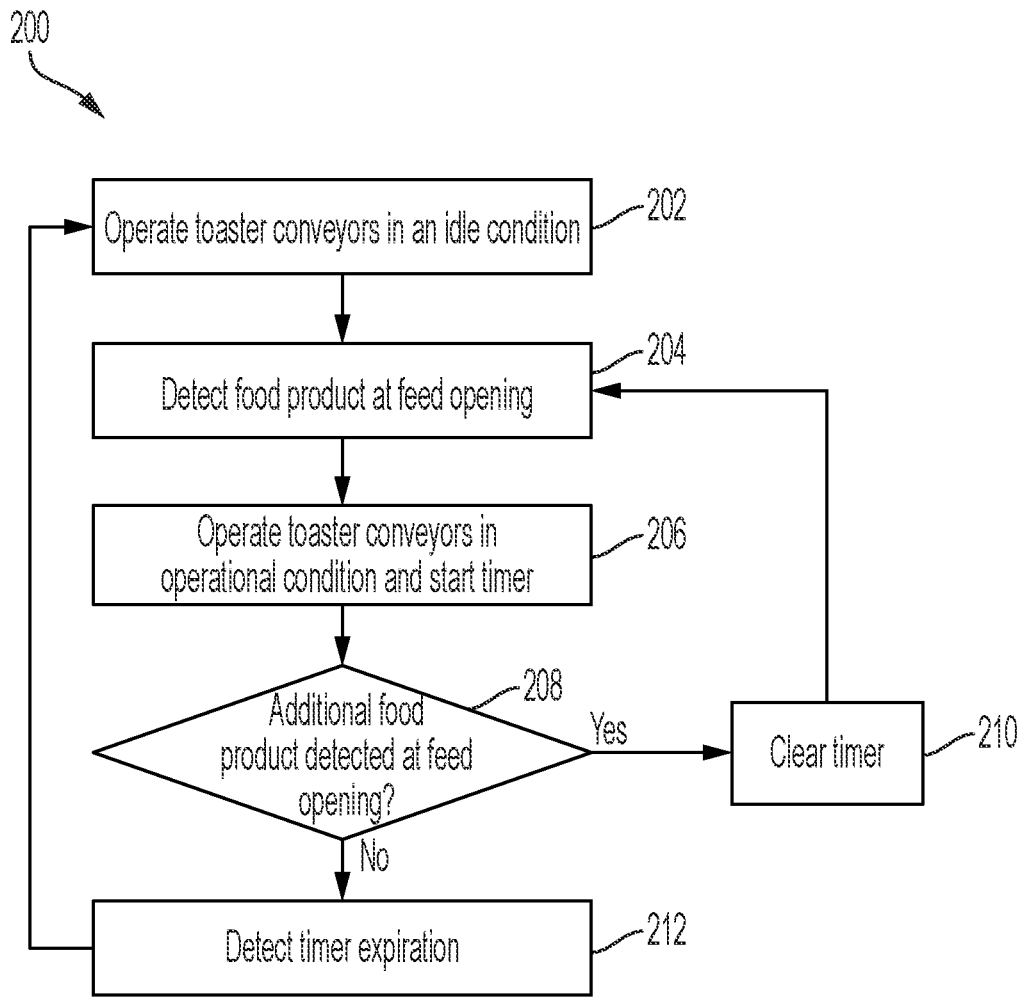
FIG. 11 is a flow chart that depicts an exemplary embodiment of a method for operating a low mileage toaster.

FIG. 11 is a flow chart that depicts an exemplary embodiment of a method 200 for operating a toaster, for example, any of the toasters 10 depicted and described above with respect to FIGS. 1-10. It will be recognized that processor 96 may execute computer-readable code as previously described to carry out the functions and perform the control operations as described in the performance of method 200.

At 202, the processor 96 operates the drive motors 38 to move the conveyor assemblies 24 and conveyor belts 30 in an idle condition. The idle condition may be a lack of motion, but in other examples may be a reduced rate of motion relative to conveyor operation for toasting the identified food product. As previously noted, the toaster 10 may have received an input indicative of a food product to be toasted, and adjust one or more parameters of the operation of the toaster 10 accordingly. In an example, the conveyor speeds in the operational condition and in the idle condition may be one of the parameters that are associated with food product to be toasted. In one example, when in the idle condition, the conveyor belts 30 may be operated to travel at a speed of approximately 60 seconds per complete revolution. In some implementations, idle condition may be stored in computer readable media 112 and configurable by a user or technician using the keyboard or touch sensitive display 20. At 204, the processor 96 detects the presence of food product at least one or both of the feed openings 14. As described above, the processor 96 may detect the presence of food based on signals received from the input sensor 40.

Upon detection of a food product, the processor 96 operates at least one drive motor 38 at 206 in the operational condition, which includes an increase in the speed of at least one conveyor belt 30 to an operational speed adapted to achieve the desired toasting effect on the food product. It will be recognized that conveyor speed is generally determinative of toasting time spent by the food product exposed to one or more heating elements within the toaster. In some implementations, the speed for the conveyor belts 30 in the operational condition may be stored in computer readable media 112. In other implementations, step 206 additionally includes a food identification step, for example in the manners as previously described, utilizing, for example, video and/or image capturing 120, size detection 122, POS inputs, or direct user inputs. The conveyor belt speeds in the operational condition and the idle condition may be previously stored in the computer readable media 112 and accessed based upon the identification of the food product. Based on the identification of the food product, the processor 96 may retrieve the conveyor speeds in the operational condition and in the idle condition associated with the food item from the food product database 116.

It will be recognized that in examples wherein the input sensor is associated with a single feed opening 14 and single conveyor belt 30, the processor 96 may operate an associated drive motor 38 and/or conveyor assembly 24 individually based upon the signals provided from the input sensor 40. In other examples, the input sensor 40 is associated with two or more feed openings 14 and conveyor belts 30 and the processor 96 may operate the two or more conveyor assemblies 24 based upon the signals provided from the input sensor 40.

The processor 96 also initiates a timer component at 206. The length the timer component is configured to run determines how long the conveyor belts 30 run at the conveyor speed in the operational condition before returning to the conveyor speed in the idle condition. The run time may be fixed or may be variable based upon any of a number of factors, including, but not limited to, daily patterns of toaster demand. For example, a toaster that is in higher demand during a lunch period and in lower demand during a breakfast period may have a longer time period during 11 AM-2 PM and a shorter timer period during 6 AM-9 AM. In other words, the conveyor belts 30 may remain at the conveyor belt speed in the operational condition for a longer time during periods of generally high toaster demand before entering the idle condition. This may prevent excessive oscillation of the conveyor assemblies 24 between high and low speeds. In some implementations, the length of the timer may be configurable by a user or technician using the keyboard or touch sensitive display 20. In other implementations, timer lengths may be pre-programmed at the time of manufacture or automatically determined by the processor 96.

At 208, the processor 96 determines whether additional food items have been detected by an input sensor 40. If additional food product are detected by an input sensor 40 within a predetermined time on the timer since the previous detection of a food product, the method 200 advances to 210 and the processor 96 clears the timer before reverting to step 204. However, if additional food products are not detected by an input sensor 40, the method 200 advances to 212 and the timer expires. Upon the expiration of the timer at 212, method 200 reverts to 202 and operates the conveyor assemblies 24 at the idle condition.

In examples, wherein dedicated input sensors are provided for each associated conveyor 30, it is recognized that the conveyors 30/conveyor assemblies 24 may be operated independently between the operational condition and the idle condition. That is, that at any time, dependent upon the signals received by the processor 96 from the input sensors, either or both of the conveyors may be in the operational condition or in the idle condition. With a reference to FIG. 10, in the input sensor arrangement depicted and described therein, the broken beam signal from the input sensor is interpreted by the processor 96 as an incoming food product, while the beam received signal from the input sensor is interpreted by the processor 96 as indicating that the food product is fully within the cabinet and is being toasted. Therefore in this example, the timer intervals as discussed above may be adjusted to reflect these interpretations. As an example, a shorter timer interval from when the light beam is detected by the input sensor to a subsequent breaking of the light beam may exemplarily be used when switching between the operational condition and the idle condition in association with the above interpretations In still further examples of the systems and methods as described herein, the processor 96 may be communicably coupled to a broiler or other cooking appliance (e.g. to a processor or controller thereof) to ensure a complementary protein product, for example, a hamburger patty, is cooked at the same time that the food product loaded into the toaster 10 is toasted.

Although the sensors utilized to detect food items described above are light-emitting and receiving sensors, any sensing method suitable to detect the presence of a food item at the first feed opening 208 and the second feed opening 210 may be utilized, including time of flight sensors, capacitive sensors, or ultrasonic sensors that detect disturbance of soundwave patterns. An optical sensor with an optical notch filter and a photodiode may be configured to detect a difference in color between a food product and a conveyor belt 30. In still further embodiments, the processor 96 may be configured to detect the presence of a food product based on a change in capacitance detected when the food item contacts a conveyor belt 30.

Citations to references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A conveyor toaster comprising:
   a cabinet;
   a heating element within the cabinet;
   an opening extending through the cabinet and configured to receive a food product;
   a conveyor assembly positioned within the cabinet and associated with the opening, the conveyor assembly comprising a conveyor belt operated by a drive motor to transport the food product past the heating element in a first direction;
   an input sensor arranged proximate the opening and configured to detect the food product on the conveyor belt; and
   a processor operably coupled to the input sensor and the conveyor assembly, wherein the processor is configured to receive a signal from the input sensor and in response to the signal operate the drive motor to advance the conveyor belt in the first direction at a first belt speed and after an elapse of a configurable demand period, operate the drive motor to advance the conveyor belt in the first direction at a second belt speed, wherein the first belt speed is greater than the second belt speed.

2. The conveyor toaster of claim 1, wherein the input sensor comprises a photoemitter and a photodetector.

3. The conveyor toaster of claim 2, wherein the input sensor further comprises a mirror assembly comprising at least one mirror.

4. The conveyor toaster of claim 2, wherein the photoemitter and the photodetector are arranged on a same side of the opening and the minor is positioned opposite the photoemitter and the photodetector across the opening.

5. The conveyor toaster of claim 4, further comprising:
   a first housing arranged exterior of the cabinet to a first side of the opening, wherein the photoemitter and the photodetector are positioned within the first housing; and
   a second housing arranged exterior of the cabinet to a second side of the opening, across from the first side of the opening, wherein the minor assembly is positioned within the second housing.

6. The conveyor toaster of claim 4, wherein a beam of light emitted from the photoemitter follows an origination path between the photoemitter and the minor assembly and the beam of light follows a return path between the minor assembly and the photodetector, wherein the origination path is offset from the return path.

7. The conveyor toaster of claim 2, wherein the input sensor comprises a time of flight sensor.

8. The conveyor toaster of claim 2, wherein the photoemitter and the photodetector are arranged at an angle relative the conveyor.

9. The conveyor toaster of claim 2, further comprising:
   a first housing arranged exterior of the cabinet to a first side of the opening, the first housing having a first aperture therethrough, wherein one of the photoemitter and the photodetector of the input sensor are positioned within the first housing in alignment with the first aperture; and
   a second housing arranged exterior of the cabinet to a second side of the opening, across from the first side of the opening, the second housing having a second aperture therethrough, an other of the photoemitter and the photodetector of the input sensor is positioned within the second housing in alignment with the second aperture.

10. The conveyor toaster of claim 2, wherein the opening is a first feed opening and the conveyor assembly is a first conveyor assembly, the toaster further comprising:
    a second feed opening extending through the cabinet and configured to receive the food product; and
    a second conveyor assembly positioned within the cabinet and associated with the second feed opening, the second conveyor assembly comprising a second conveyor belt operated by a second drive motor;
    wherein the processor is operably coupled to input sensor and the second conveyor assembly and the processor is configured in response to the signal from the input sensor to operate the second drive motor to advance the second conveyor belt in the first direction at the first belt speed and operate the second drive motor to advance the second conveyor belt in the first direction at the second belt speed.

11. The conveyor toaster of claim 10, wherein the input sensor further comprises a mirror assembly comprising at least one mirror, the mirror assembly arranged opposite the opening from the photoemitter and the photodetector.

12. The conveyor toaster of claim 11, wherein a beam of light emitted from the photoemitter follows an origination path across the first feed opening between the photoemitter and the mirror assembly and the beam of light follows a return path across the second feed opening between the mirror assembly and the photodetector.

13. The conveyor toaster of claim 12, wherein one of the origination path and the return path is located outside of the cabinet and an other of the origination path and the return path is located inside the cabinet.

14. The conveyor toaster of claim 11, wherein the input sensor is a first input sensor, the photodetector is a first photodetector, the photoemitter is a first photoemitter, and the mirror assembly is a first mirror assembly, and the first photoemitter and the first photodetector are arranged to a first side of the first feed opening and the first mirror assembly is arranged to a second side of the first feed opening opposite the first side, the conveyor toaster further comprising:
 a second input sensor comprising a second photoemitter and a second photodetector, the second photoemitter and the second photodetector arranged to a first side of the second feed opening; and
 a second mirror assembly arranged to a second side of the second feed opening opposite the first side of the second feed opening.

15. The conveyor toaster of claim 14, wherein the first input sensor produces a first light beam with a first origination path across the first feed opening between the first photoemitter and the first mirror assembly and a first return path across the first feed opening between the first mirror assembly and the first photodetector, wherein the first origination path is offset from the second origination path; and
 wherein the second input sensor produces a second light beam with a second origination path across the second feed opening between the second photoemitter and the second mirror assembly and a second return path across the second feed opening between the second mirror assembly and the first photodetector, wherein the second origination path is offset from the second return path.

16. The conveyor toaster of claim 10, wherein the input sensor is a first input sensor, the photodetector is a first photodetector, the photoemitter is a first photoemitter, wherein the first photoemitter is arranged to a first side of the first feed opening and the first photodetector is arranged to a second side of the first feed opening, the second side opposite the first side, the conveyor toaster further comprising:
 a second input sensor comprising a second photoemitter arranged to a first side of the second feed opening and a second photodetector arranged to a second side of the second feed opening, the second side opposite the first side.

17. The conveyor belt toaster of claim 1, wherein the conveyor is arranged horizontally and partially extends out of the cabinet through the opening.

* * * * *

UNITED STATES PATENT AND TRADEMARK OFFICE
CERTIFICATE OF CORRECTION

PATENT NO. : 12,004,689 B2
APPLICATION NO. : 17/217396
DATED : June 11, 2024
INVENTOR(S) : Christopher Lyons et al.

It is certified that error appears in the above-identified patent and that said Letters Patent is hereby corrected as shown below:

In the Claims

In Column 16, Line 8, of Claim 4; Column 16, Line 17, of Claim 5; Column 16, Lines 21 and 22, of Claim 6; Column 17, Line 1, of Claim 12; and Column 17, Lines 11 and 13, of Claim 14:
"minor"
Should read:
--"mirror"--

Signed and Sealed this
Twenty-third Day of July, 2024

Katherine Kelly Vidal
*Director of the United States Patent and Trademark Office*